United States Patent [19]

Heenan

[11] 3,801,447

[45] Apr. 2, 1974

[54] VENTILLATION OF NUCLEAR REACTION FUEL RODS

[76] Inventor: William A. Heenan, Chem. Emon. Dept. Caan Univ., Mayaguez, P.R. 00708

[22] Filed: Nov. 16, 1971

[21] Appl. No.: 199,244

Related U.S. Application Data

[63] Continuation-in-part of Ser. No. 808,571, March 19, 1969, abandoned.

[52] U.S. Cl. .................................. 176/40, 176/79
[51] Int. Cl. ........................... G21c 3/10, G21c 1/02
[58] Field of Search ........................ 176/79, 37, 40

[56] References Cited
UNITED STATES PATENTS

| | | | |
|---|---|---|---|
| 3,356,585 | 12/1967 | Zebroski | 176/68 |
| 3,697,377 | 10/1972 | Gauthron | 176/79 |
| 3,406,094 | 10/1968 | Beisswenger et al. | 176/79 |
| 3,459,636 | 8/1969 | Germer | 176/68 |

*Primary Examiner*—Reuben Epstein
*Attorney, Agent, or Firm*—Edwin T. Grimes

[57] ABSTRACT

This invention relates to a venting device for nuclear reactor control and fuel rods having fissionable material contained in a cladding, characterized by a porous disk forming part of the wall of the rod, said disk allowing the fission gases to pass therethrough and preventing the liquid sodium coolant from entering the rod.

4 Claims, 2 Drawing Figures

PATENTED APR 2 1974                                    3,801,447
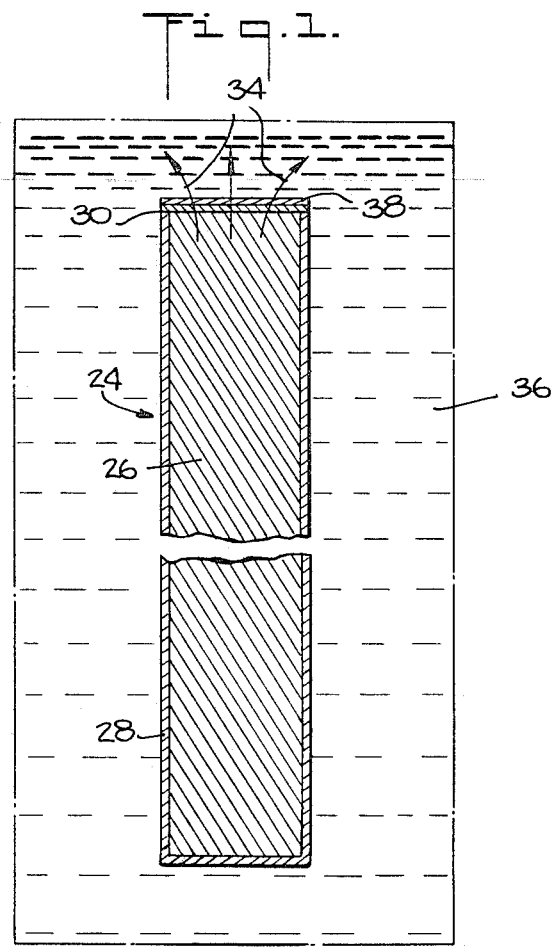
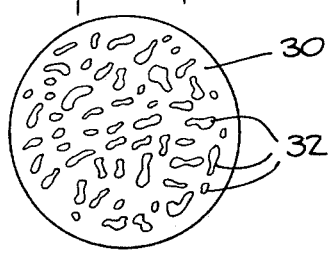

VENTILLATION OF NUCLEAR REACTION FUEL RODS

This application is a continuation-in-part application of my copending application Ser. No. 808,571, entitled "Ventilation of Nuclear Reactor Control and Fuel Rods," filed Mar. 19, 1969, now abandoned.

This invention has to do with nuclear reactors, and more particularly with control and fuel rods for use therewith.

During operation of nuclear reactors, fission reactions take place in control and fuel elements or rods, which generate or release gases such as helium, xenon, krypton, etc, for example. In the usual construction of such rods, the gas generating or fissionable materials are retained in a cladding, and hence the released gases build up pressure in the rods and eventually could cause the rods to rupture or deform. Therefore, it is desirable to release the generating gases in some manner.

In conventional liquid metal fast breeder reactors these rods are completely immersed in liquid sodium which acts as a coolant, and hence the fission gases must be released into the sodium. It will be appreciated that it is undesirable to have the sodium coolant enter the rods, and at times the sodium pressure is greater than the released helium gas pressure, thereby tending to force the sodium into the rods.

Heretofore, attempts were made to try to solve this problem in nuclear reactor systems by either venting the fission product gases and volatile materials directly from the fuel element to a fission product transfer system exterior of the reactor, or by constructing the cladding of very heavy material which contained the gas pressure for the life of the fuel element. These solutions to the aforementioned problem were not entirely satisfactory as they were either complicated and expensive to fabricate or else they resulted in a substantial reduction in the reactor efficiency. It is an object of this invention to overcome these prior art difficulties, as will become apparent as the description proceeds.

Briefly, my invention contemplates the provision of a new and improved control or fuel rod assembly for a nuclear reactor having fissionable material contained in a cladding. Venting means are provided which are characterized by a porous disk which has pores extending therethrough of a selected size to allow the fission gases to escape from the rod to the surrounding liquid sodium coolant, but preventing the coolant from entering the rod.

In one form of the invention the disk is pre-wetted by liquid sodium and the pores are sized to prevent the venting of fission gases until a preselected pressure is obtained within the rod. The preselected pressure is substantially above the normal operating pressure of the liquid coolant.

According to a form of the invention, a pre-wetted disk is employed and a rupturable member is interposed adjacent the disk and between the disk and the liquid sodium coolant. This member is adapted to fail at a preselected pressure which is slightly below the normal operating pressure of the fission gases and substantially above the normal operating pressure of the liquid sodium coolant, thereby to allow time for the fission gases to build up pressure in the control or fuel rod. That is, the rupturable member initially prevents the inflow of the liquid sodium coolant into the fuel rod while the fission gases are at their initial low pressures. After the fission gases have built up to an extent sufficient to prevent the inflow of the sodium coolant they rupture the rupturable member. This allows the fission gases to escape from the fuel rod to the surrounding liquid sodium coolant, but prevents the coolant from entering the rod.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

One embodiment of the the invention has been chosen for purposes of illustration and description and is shown in the accompanying drawings, forming a part of the specification, wherein:

FIG. 1 is a medial, longitudinal sectional view of a control or fuel rod assembly constructed according to the concept of this invention; and FIG. 2 is an enlarged, plan view of a porous disk used with the control or fuel rod of FIG. 1.

In the embodiment of the invention illustrated, a control or fuel rod, indicated generally at 24, comprises poisons or fissionable material 26 contained in a cladding 28 provided for the purpose. Means are provided for venting the rod, which include porous disks 30 that form part of the wall thereof.

Referring to FIG. 2, the disks 30 are characterized by pores 32 extending therethrough, which are of a preselected size to allow the fission gases such as helium, xenon, krypton, for example, to escape from the rod, as indicated by the arrows 34, FIG. 1, but to prevent the liquid sodium coolant 36 from entering the rod. In this embodiment of my invention, the disks are wetted by the liquid sodium, but do not react appreciably with the sodium. That is, the pores 32 are filled with sodium, at a temperature of the order of about 500° F. prior to being mounted in the fuel rod. The pressure drop across the disk is characterized by the equation:

$$\Delta P = 2 \gamma \cos \theta / \omega$$

where $\gamma$ = liquid surface tension
$\theta$ = contact angle
$\omega$ = pore radius
$\Delta P$ = pressure drop That is, when the disks are wet, a pressure equal to $\Delta P$ is required to force the sodium out of the pores. It has been found that for porous materials having about 0.1 micron nominal diameter pore size, this pressure is between about 20 p.s.i. and about 300 p.s.i. Therefore, the fission gas generated cannot escape from the rod 24 until a corresponding pressure of between about 20 p.s.i. and about 300 p.s.i. is reached within the rod. When this pressure is exceeded the gas escapes and thereby automatically maintains this pressure in the rod. No sodium can enter the rod because the normal operating pressure of the liquid sodium coolant has a maximum of about 6 p.s.i. to about 10 p.s.i. In one form of the invention, a rupturable member or rupture disk 38, FIG. 1, is interposed adjacent the disk 30 and between the disk and the liquid sodium coolant 36. The rupture disk 38 is designed to fail at a pressure between about 15 p.s.i. and about 200 p.s.i., for example, when starting up the reactor in order to allow time for the helium and other fission gases to build up pressure in the rod 24. That is, the rupturable member 38 initially prevents the inflow of the sodium coolant 36 into the fuel rod 24 while the fission gases are at their initial low pressures. After operating for a period of time the fission gases build up to a pressure which is sufficient to prevent the inflow of the sodium coolant 36. At this time the gases rupture the rupturable member 38, thereby allowing the fission gases to escape from the fuel rod into the surrounding liquid sodium coolant 36, but preventing the coolant from entering the rod. If desired, the rods 24 can be pre-pressurized with a gas such as helium, for example, in order to protect the fissionable material 26 and to reduce the period of time required to build up the fission gas pressure.

In order to provide the characteristics as described hereinbefore, the disks 30 are fabricated, such as by hot pressing for example, from any suitable material such as one selected from the group consisting of nickel, Inconel, molybdenum, steel having the following composition: up to about 0.12 percent C, up to 2.00 percent Mn, up to 0.045 percent P, up to 0.030 percent S, up to 1.00 percent Si, 16.0 to 23.0 percent Cr, 7.00 to 14.00 percent Ni, balance substantially iron, and alloys thereof and pre-wetted before assembly at a temperature above about 500° F. The fissionable material, the rupture disk and the cladding material may be fabricated from any suitable material well known in the art.

It will thus be seen that the present invention does indeed provide an improved fuel element which is superior in simplicity of construction, economy, and operating efficiency as compared to prior art control and fuel rods.

Although a particular embodiment of the invention is herein disclosed for purposes of explanation, various modifications thereof, after study of this specification, will be apparent to those skilled in the art to which the invention pertains.

What is claimed and desired to be secured by letters patent is:

1. In a nuclear reactor utilizing a liquid sodium coolant, a clad fuel rod, immersible in said coolant, and venting means including a porous sodium pre-wetted disk mounted at one end of said rod, said disk having pore means extending therethrough for preventing the passage of liquid sodium molecules and for preventing the passage of fission gases below a selected pressure between about 20 p.s.i. and about 300 p.s.i. and which is substantially above a normal operating pressure of the liquid sodium coolant and for allowing the passage of fission gases at a pressure above said preselected pressure, and a rupturable member interposed between said disk and said liquidsodium coolant, said rupturable member being rupturable at a pressure below said preselected pressure and substantially above said normal operating pressure of the liquid sodium coolant.

2. Apparatus according to claim 1 wherein said pores have a diameter of the order of about 0.1 microns.

3. Apparatus according to claim 3 wherein said disk material is selected from the group consisting of nickel, Inconel, molybdenum, and steel having the following composition: up to about 0.12 percent C, up to 2.00 percent Mn, up to 0.045 percent P, up to 0.030 percent S, up to 1.00 percent Si, 16.0 to 23.0 percent Cr, 7.00 to 14.00 percent Ni, balance substantially iron, and said disk being pre-wetted at a temperature above about 500° F.

4. Apparatus according to claim 1 wherein said disk is pre-wetted at a temperature of about 500° F.

* * * * *